United States Patent [19]

Stemme et al.

[11] 4,214,824
[45] Jul. 29, 1980

[54] PHOTOGRAPHIC-CAMERA FOCUSSING SYSTEM WITH COMPARATOR RECEIVING REQUIRED-AND ACTUAL-SETTING DATA

[75] Inventors: Otto Stemme, Munich; Peter Lermann, Narring; Eduard Wagensonner, Ascheim; Istvan Cocron, Munich, all of Fed. Rep. of Germany

[73] Assignee: AGFA-Gevaert, A.G., Leverkusen, Fed. Rep. of Germany

[21] Appl. No.: 3,809

[22] Filed: Jan. 16, 1979

[30] Foreign Application Priority Data

Jan. 16, 1978 [DE] Fed. Rep. of Germany ....... 2801747

[51] Int. Cl.³ .............................................. G03B 13/02
[52] U.S. Cl. .................................. 354/23 D; 354/25; 354/289; 354/195
[58] Field of Search ................. 354/23 D, 25, 53, 195, 354/289, 60 L, 198

[56] References Cited

U.S. PATENT DOCUMENTS

| 4,065,778 | 12/1977 | Harvey ................................. 354/25 |
| 4,142,788 | 3/1979 | Matsumoto et al. .................. 354/195 |

*Primary Examiner*—L. T. Hix
*Assistant Examiner*—W. J. Brady
*Attorney, Agent, or Firm*—Michael J. Striker

[57] ABSTRACT

A photographic camera has an exposure objective and a focus adjuster device for changing the subject-distance setting of the exposure objective, as well as a transducer generating actual-setting signals dependent upon the setting of the focus adjuster device. An evaluating circuit, operative for ascertaining camera-to-subject distance on one basis or another, produces digital required-setting signals, expressed using a first encoding scheme, whereas the actual-setting signals generated by the aforementioned transducer are expressed using a different, second encoding scheme. The actual-setting signals are applied to the first input of a comparator stage, whose second input receives a transformed version of the required-setting signals, transformed from the first to the second encoding scheme, i.e., so that the comparator can compare, in a direct and simple way, the actual-setting signals and required-setting signals against each other with both signals expressed in accordance with one and the same encoding scheme. The output signals produced by the comparator control indicator which informs the user of the direction in which the manual focus adjuster of the camera should be moved to improve the camera's state of focus, and/or control the energization of an electric motor or other electromagnetic positioning device operative for controlling the setting of the focus adjusting device.

4 Claims, 1 Drawing Figure

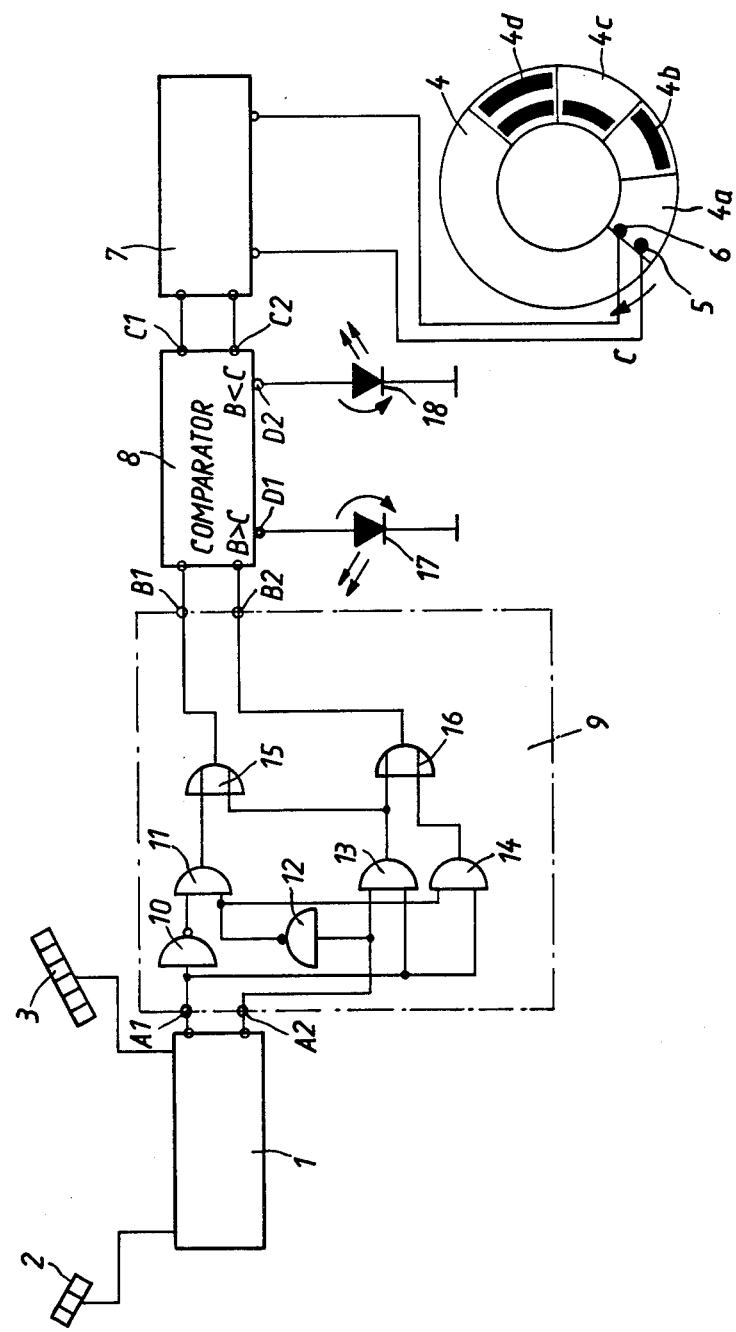

PHOTOGRAPHIC-CAMERA FOCUSSING SYSTEM WITH COMPARATOR RECEIVING REQUIRED- AND ACTUAL-SETTING DATA

BACKGROUND OF THE INVENTION

The present invention concerns still or motion-picture photographic cameras of the type provided with a focussing system serving to generate digital required-setting data in dependence upon the distance from the camera to the subject, the latter distance being measured in any of various ways. Actual-setting data is furnished by a feedback transducer system cooperating with the exposure objective of the camera. The digital required-setting data and the actual-setting data are applied to inputs of a comparator. The signals produced at the output of the comparator are then dependent upon the difference between the present and required subject-distance settings of the camera and can be used to energize an adjusting motor operative for automatically shifting the exposure objective to the required subject-distance setting, or the comparator output signals can be used to activate an indicator device which informs the user of the camera of the direction in which he should manually move the camera's focus adjuster member to manually correct the present state of focus of the camera.

The digital required-setting data generated by such an automatic or semiautomatic focussing system are typically generated by a signal-evaluating circuit which evaluates signals of any of various types, e.g., the output signals from photodetectors in photodetector arrays, the time-of-arrival signals produced in an acoustic-wave-travel-time measuring system, and so forth. Depending upon which type of physical measurement is relied on to generate subject-distance information, and/or depending upon what type of signal-evaluating circuit is used to actually produce the digital required-setting data, the digital required-setting data may take on a variety of forms, e.g., a 1-out-of-n code, an elementary binary code in which successive bit combinations, representing successively higher numbers, furthermore representing successively greater subject distances; and so forth.

SUMMARY OF THE INVENTION

It is the general object of the invention to provide an automatic or semiautomatic focussing system of the type in question, but so designed that the system can employ digital signal-evaluating circuitry of any of various types, without however the selection of a particular type of signal-evaluating circuitry requiring any modification of the feedback transducer system employed to generate the signals indicative of the present subject-distance settings of the camera. Most especially, this object is to be achieved in a very simple way and with minimal cost.

In accordance with the present invention, a code-conversion stage is provided intermediate the aforementioned signal-evaluating circuitry and the associated input(s) of the system's comparator, the code-conversion stage preferably comprised only of inverters and logic gates, the code-conversion stage serving to transform the digital required-setting data furnished by the signal-evaluating circuitry from a first code into a second code, the second code corresponding to that employed for the actual-setting data furnished to the other input(s) of the system's comparator, so that the system's comparator can perform a straightforward and elementary comparison between required-setting and actual-setting data, both types of data being presented to it in the same signal code.

Advantageously, the code-conversion stage performs only one code conversion, i.e., from the signal code used for the signals produced by the signal-evaluating circuitry into the signal code used for the actual-setting data fed to the other input(s) of the system's comparator, i.e., so that there be a simple, permanent and one-for-one correspondence between signal combinations produced by the signal-evaluating circuitry, on the one hand, and, on the other hand, the signal combinations furnished by the code-conversion stage to the system's comparator.

In accordance with a preferred concept of the present invention, the feedback-transducer system used to generate actual-setting information furnishes such information using binary code, with the bit combinations produced representing successively higher numbers and, corresponding thereto, successively higher subject-distance settings.

In accordance with another preferred concept of the present invention, the code-conversion stage is designed as a 2-bit binary-code code-conversion stage comprised of inverters, AND-gates and OR-gates, with the number of AND-gates employed being equal to the number of signal combinations to be converted, with the inputs of the OR-gates being connected to the outputs of different ones of the AND-gates.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE depicts one, merely exemplary embodiment of the present invention.

DESCRIPTION OF THE PREFERRED EMBODIMENT

In the FIGURE, numeral 1 denotes a signal-evaluating circuit operative for evaluating the signals from the photodetectors in a first photodetector arrangement 2 and those from the photodetectors in a second photodetector arrangement 3. This arrangement of photodetectors and signal-evaluating circuit is here illustrated by way of example, and may for example be of the type disclosed in commonly owned copending application Ser. Nos. 2,932 and 2,938 filed on Jan. 12 and 13, 1979 by Peter Lermann et al respectively entitled "FOCUSSING SYSTEM" and "PHOTOGRAPHIC CAMERA". The difference between the number of photodetectors in the first photodetector arrangement 2 and the number of photodetectors in the second photodetector arrangement 3 determines the number of different subject-distance settings which the signal-evaluating circuit 1 can identify for command or control purposes, i.e., in the particular and merely exemplary embodiment here illustrated.

For explanatory purposes, let it be assumed that when the system 1, 2, 3 identifies the nearest or lowest subject-distance range available, this is represented by a "0"

signal at output A1 and the output A2 a "1" signal. To identify the next subject-distance setting, output A1 furnishes a "1" signal, and output A2 a "0" signal. To identify the third subject-distance setting, "0" signals are furnished on both outputs A1 and A2. To identify the fourth and furthest subject-distance setting or range, "1" signals are produced on both outputs A1 and A2. It will be assumed, merely for purposes of explanation, that the first subject-distance setting corresponds to subject distances from 1 meter to 1.4 meters, the second to subject distances from 1.4 meters to 2 meters, the third to subject distances from 2 meters to 4 meters, and the fourth to subject distances from 4 meters to infinity.

The camera is provided with a focus adjuster member 4, herein the form of an objective-adjusting ring. Focus adjuster ring 4 is provided with four contact zones 4a, 4b, 4c, 4d, corresponding to the four subject-distance settings or ranges which the system 1, 2, 3 is capable of identifying. In particular, numerals 5 and 6 denote two stationarily mounted wiper contacts which sweep across the surface of the focus adjuster ring 4 as the latter is turned in the direction of arrow C. In the illustrated starting position of the focus adjuster ring 4, the (non-illustrated) exposure objective of the camera is set for the shortest subject-distance range, and the stationary wiper contacts 5, 6 are located in contact zone 4a, where in fact no contacts are present. A signal-generating stage 7 converts the potentials encountered by the contact wipers 5, 6 at successive ones of the contact zones 4a, 4b, 4c, 4d on focus adjuster ring 4 into digital signal pairs produced at outputs C1, C2. When focus adjuster ring 4 is in its shortest subject-distance setting, i.e., with wiper contacts 5, 6 located in contact zone 4a, "0" signals are present at both the outputs C1, C2 of signal-generating stage 7. When focus adjuster ring 4 is in the next-higher setting, associated with contact zone 4b, a "0" signal is present at output C1 and a "1" signal at output C2. In the third subject-distance setting, associated with contact zone 4c, output C1 furnishes a "1" signal and output C2 a "0" signal. In the furthest subject-distance setting, associated with contact zone 4d, output C1 furnishes a "1" signal and output C2 likewise furnishes a "1" signal.

Accordingly, in the exemplary embodiment illustrated, as the focus adjuster ring 4 is moved through its four successively higher (longer) subject-distance settings, the 2-bit code successively produced at outputs C1, C2 of signal-generating stage 7 (namely, in the sequence 00, 01, 10, 11) corresponds to numbers representing a linearly increasing sequence which increases with increasing subject distance.

Now, the 2-bit numbers produced at outputs A1, A2 of signal-evaluating circuit 1 should be compared with the 2-bit numbers produced at the outputs C1, C2 of the signal-generating stage 7. A comparator 8 is provided for this purpose. The comparator 8 has two outputs denoted D1, D2.

To adapt the signal pairs produced at outputs A1, A2 to the signal pairs produced at outputs C1, C2 of signal-generating stage 7, use is here made of a code-conversion stage 9. Code-conversion stage 9 comprises an inverter 10 whose input is connected to output A1, the output of inverter 10 being connected to the upper input of a first AND-gate 11. The lower input of first AND-gate 11 is connected, through the intermediary of an inverter 12, to the second output A2 of signal-evaluating circuit 1.

The two inputs of a second AND-gate 13 are directly connected to respective ones of the two outputs A1, A2 of signal-evaluating circuit 1.

A third AND-gate 14 has a lower input connected directly to output A1 of signal-evaluating circuit 1, and has an upper input connected to output A2 but through the intermediary of the inverter 12.

A first OR-gate 15 has an upper input connected to the output of AND-gate 11 and a lower input connected to the output of AND-gate 13. A second OR-gate 16 has an upper input connected to the output of AND-gate 13 and a lower input connected to the output of AND-gate 14. The output of OR-gate 15 is connected to input B1 of comparator 8, and the output of OR-gate 16 to input B2 of comparator 8.

If the outputs A1, A2 respectively carry the signal combination "0, 1" to identify the shortest available subject-distance setting, the two inputs B1, B2 of comparator 8 are both in receipt of "0" signals, i.e., the signal combination "0, 0".

If the outputs A1 and A2 respectively carry the signals "1" and "0" to identify the second subject-distance range, these are converted into the signals "0" and "1" upon application to respective ones of the comparator inputs B1 and B2.

A third AND-gate 14 has a lower input connected directly to output A1 of signal-evaluating circuit 1, and has an upper input connected to output A2 but through the intermediary of the inverter 12.

A first OR-gate 15 has an upper input connected to the output of AND-gate 11 and a lower input connected to the output of AND-gate 13. A second OR-gate 16 has an upper input connected to the output of AND-gate 13 and a lower input connected to the output of AND-gate 14. The output of OR-gate 15 is connected to input B1 of comparator 8, and the output of OR-gate 16 to input B2 of comparator 8.

If the outputs A1, A2 respectively carry the signal combination "0, 1" to identify the shortest available subject-distance setting, the two inputs B1, B2 of comparator 8 are both in receipt of "0" signals, i.e., the signal combination "0, 0".

If the outputs A1 and A2 respectively carry the signals "1" and "0" to identify the second subject-distance range, these are converted into the signals "0" and "1" upon application to respective ones of the comparator inputs B1 and B2.

The signals "0" and "0" respectively present at outputs A1 and A2 to identify the third subject-distance setting are respectively converted to "1" and "0" for application to respective ones of the two comparator inputs B1 and B2.

The signals "1" and "1" respectively present at outputs A1 and A2 to identify the fourth or further subject-distance setting are not actually converted by code-conversion stage 9; i.e., the signal combination "1, 1" appearing at outputs A1, A2 is applied unaltered to comparator inputs B1, B2.

A first light-emitting diode 17 lights up when the 2-bit number applied to the inputs B1, B2 of comparator 8 is greater than the 2-bit number applied to inputs C1, C2 thereof. The lighting-up of LED 17 indicates to the user that the focus adjuster ring 4 should be manually turned by him clockwise in order to improve the camera's state of focus. If the 2-bit number applied to comparator inputs B1, B2 is smaller than that applied to comparator inputs C1, C2, then a light-emitting diode 18 lights up, to indicate to the user that he should manually turn the focus adjuster ring 4 in the counterclockwise direction to improve the camera's state of focus.

When the 2-bit numbers applied to B and C inputs of comparator 8 correspond, neither of two LED's 17, 18 lights up, thereby informing the user that the objective is set to the correct subject-distance setting.

In the illustrated embodiment, the output signals from the comparator 8 are used to control the lighting-up of two LED's 17, 18, but instead such signals could be used to control the energization of an electric adjusting motor serving to itself automatically adjust the angular position of focus adjuster ring 4, or to control an electromagnetic arresting device operative for arresting the focus adjuster ring 4 in a particular angular position when ring 4 is turned, for example, by a spring-powered drive mechanism triggered by the user.

Likewise, in the illustrated embodiments two 2-bit codes are employed for four different subject-distance settings, one of these two 2-bit codes being used for the signal combinations produced at outputs A1, A2 and the other for the signal combinations produced at outputs C1, C2. However, it will be understood that two different 3-bit codes might in principle be involved for identifying a greater number of successive subject-distance settings; that the number of bits in the two codes employed might not be the same, in the first place; and that, as an example of the latter, the first code (produced at the outputs of the signal-evaluating circuit 1) could for example be of the 1-out-of-n type; and so forth.

It will be understood that each of the elements described above, or two or more together, may also find a useful application in other types of circuits and constructions differing from the types described above.

While the invention has been illustrated and described as embodied in a semiautomatic focussing system affording four available subject-distance settings with subject distance being measured by optical means, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a focusing system of a photographic camera of the type provided with an exposure objective, a focus adjuster device for changing the subject-distance setting of the exposure objective, means generating coded digital actual-setting signals dependent upon the setting of the focus adjuster device, and means for automatically generating coded digital required-setting signals dependent upon the true distance from the camera to the subject to be photographed, the coded digital actual-setting signals and the coded digital required-setting signals representing subject-distance setting information using two different digital encoding schemes, a comparator having a first input connected to receive the actual-setting signals and having a second input and having an output and producing at its output signals dependent upon the relationship between the signals applied to its first and second inputs; and a code-conversion stage having an input connected to receive the coded digital signals from one of said means and having an output connected to one input of the comparator and comprising a plurality of interconnected logic gates operative for transforming the coded digital signals from the one to the other of said two different encloding schemes, whereby the comparator can perform simple and direct comparisons between actual-setting and required-setting signals.

2. In the focussing system defined in claim 1, the interconnected logic gates including inverters.

3. In the focussing system defined in claim 1, the encoding scheme employed for the actual-setting signals being a binary encoding scheme in which successively higher binary numbers are employed to represent successively longer subject distances.

4. In the focussing system defined in claim 1, each actual-setting signal being a signal pair representing a 2-bit number, each required-setting signal being a signal pair representing a 2-bit number, the code-conversion stage comprising inverters, AND-gates and OR-gates, the number of AND-gates being equal to the number of corresponding signal pairs not identical in both encoding schemes, the inputs of the AND-gates being connected directly and also via inverters to receive the required-setting signals, the inputs of the OR-gates being connected to different combinations of the outputs of the AND-gates, and the outputs of the OR-gates being connected to the second input of the comparator.

* * * * *